United States Patent
Brody et al.

(10) Patent No.: US 10,212,541 B1
(45) Date of Patent: Feb. 19, 2019

(54) SELECTIVE LOCATION-BASED IDENTITY COMMUNICATION

(71) Applicant: Snap Inc., Venice, CA (US)

(72) Inventors: Jonathan Brody, Marina Del Rey, CA (US); Walton Lin, New York, NY (US); Andrew Lin, Long Island City, NY (US); Evan Spiegel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/859,101

(22) Filed: Dec. 29, 2017

Related U.S. Application Data

(60) Provisional application No. 62/491,115, filed on Apr. 27, 2017, provisional application No. 62/554,937, filed on Sep. 6, 2017.

(51) Int. Cl.
| | | |
|---|---|---|
| *H04W 4/02* | (2018.01) | |
| *H04W 68/00* | (2009.01) | |
| *G06Q 50/00* | (2012.01) | |

(52) U.S. Cl.
CPC ............ *H04W 4/02* (2013.01); *G06Q 50/01* (2013.01); *H04W 68/005* (2013.01)

(58) Field of Classification Search
CPC ......... H04W 4/02; H04W 4/021; H04W 4/18; H04W 64/00; H04L 67/18; G06Q 50/01; H04M 1/72572; H04M 2250/10
See application file for complete search history.

(56) References Cited

U.S. PATENT DOCUMENTS

| | | | | |
|---|---|---|---|---|
| 2008/0070593 | A1* | 3/2008 | Altman .............. | H04W 4/029 455/457 |
| 2010/0262915 | A1* | 10/2010 | Bocking .............. | H04W 4/02 715/733 |
| 2010/0279713 | A1* | 11/2010 | Dicke ............... | H04M 1/72572 455/457 |
| 2010/0299060 | A1* | 11/2010 | Snavely .............. | G06Q 10/02 701/533 |
| 2011/0300837 | A1* | 12/2011 | Misiag ............. | G06F 17/30887 455/414.2 |
| 2012/0271883 | A1 | 10/2012 | Montoya et al. | |
| 2015/0160832 | A1* | 6/2015 | Walkin .............. | G06F 3/04883 715/765 |

(Continued)

OTHER PUBLICATIONS

"International Application Serial No. PCT/US2018/030039, International Search Report dated Jul. 11, 2018", 2 pgs.

(Continued)

*Primary Examiner* — Liton Miah
(74) *Attorney, Agent, or Firm* — Schwegman Lundberg & Woessner, P.A.

(57) ABSTRACT

Systems, devices, media, and methods are presented for selective location-based identity communication. The systems and methods identify a current location of a mobile computing device and detect a selection of a user interface element associated with the current location. The systems and methods cause presentation of a set of display elements corresponding to the current location and detect selection of a display element of the set of display elements. The systems and methods modify a display characteristic for the current location of the mobile computing device within a set of mobile computing devices based on the selection of the display element.

11 Claims, 11 Drawing Sheets

(56) References Cited

U.S. PATENT DOCUMENTS

| | | |
|---|---|---|
| 2015/0245168 A1 | 8/2015 | Martin |
| 2015/0350262 A1* | 12/2015 | Rainisto .................. H04L 43/16 |
| | | 709/204 |
| 2016/0078095 A1 | 3/2016 | Man et al. |
| 2016/0164823 A1 | 6/2016 | Nordstrom et al. |
| 2016/0350297 A1 | 12/2016 | Riza |
| 2016/0378278 A1* | 12/2016 | Sirpal ..................... G06T 11/60 |
| | | 715/765 |

OTHER PUBLICATIONS

"International Application Serial No. PCT/US2018/030039, Written Opinion dated Jul. 11, 2018", 4 pgs.
"International Application Serial No. PCT/US2018/030043, International Search Report dated Jul. 23, 2018", 2 pgs.
"International Application Serial No. PCT/US2018/030043, Written Opinion dated Jul. 23, 2018", 5 pgs.

* cited by examiner

SELECTIVE LOCATION-BASED IDENTITY COMMUNICATION

The present application claims priority benefit of U.S. Provisional Patent Application Ser. No. 62/491,115 filed on Apr. 27, 2017, and entitled "GEOLOCATION-BASED INTERFACE FOR SOCIAL MEDIA APPLICATIONS" and U.S. Provisional Patent Application Ser. No. 62/554,937 filed Sep. 6, 2017, and entitled "SELECTIVE LOCATION-BASED IDENTITY COMMUNICATION," which are incorporated herein by reference in their entirety.

TECHNICAL FIELD

Embodiments of the present disclosure relate generally to selective communication of a location-based identification. More particularly, but not by way of limitation, the present disclosure addresses systems and methods for determining a location of a mobile computing device and selectively presenting location information of the mobile computing device at other mobile computing devices.

BACKGROUND

Social media applications implement computer-mediated technologies allowing for the creating and sharing of content that communicates information, ideas, interests, and other forms of expression via virtual communities and networks. Social media platforms use web-based technologies, desktop computers, and mobile technologies (e.g., smartphones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user. Social media content posted by users is often geo-tagged based on the geolocation of a mobile electronic device (such as a mobile phone) by use of which the social media content is captured and/or posted to the social media platform. In other embodiments, social media content may explicitly be geo-tagged by a user using a computer device that does not have activated geolocation services and/or that is not a mobile device (such as a desktop PC).

BRIEF DESCRIPTION OF THE DRAWINGS

Various ones of the appended drawings merely illustrate example embodiments of the present disclosure and should not be considered as limiting its scope.

Figure 1:
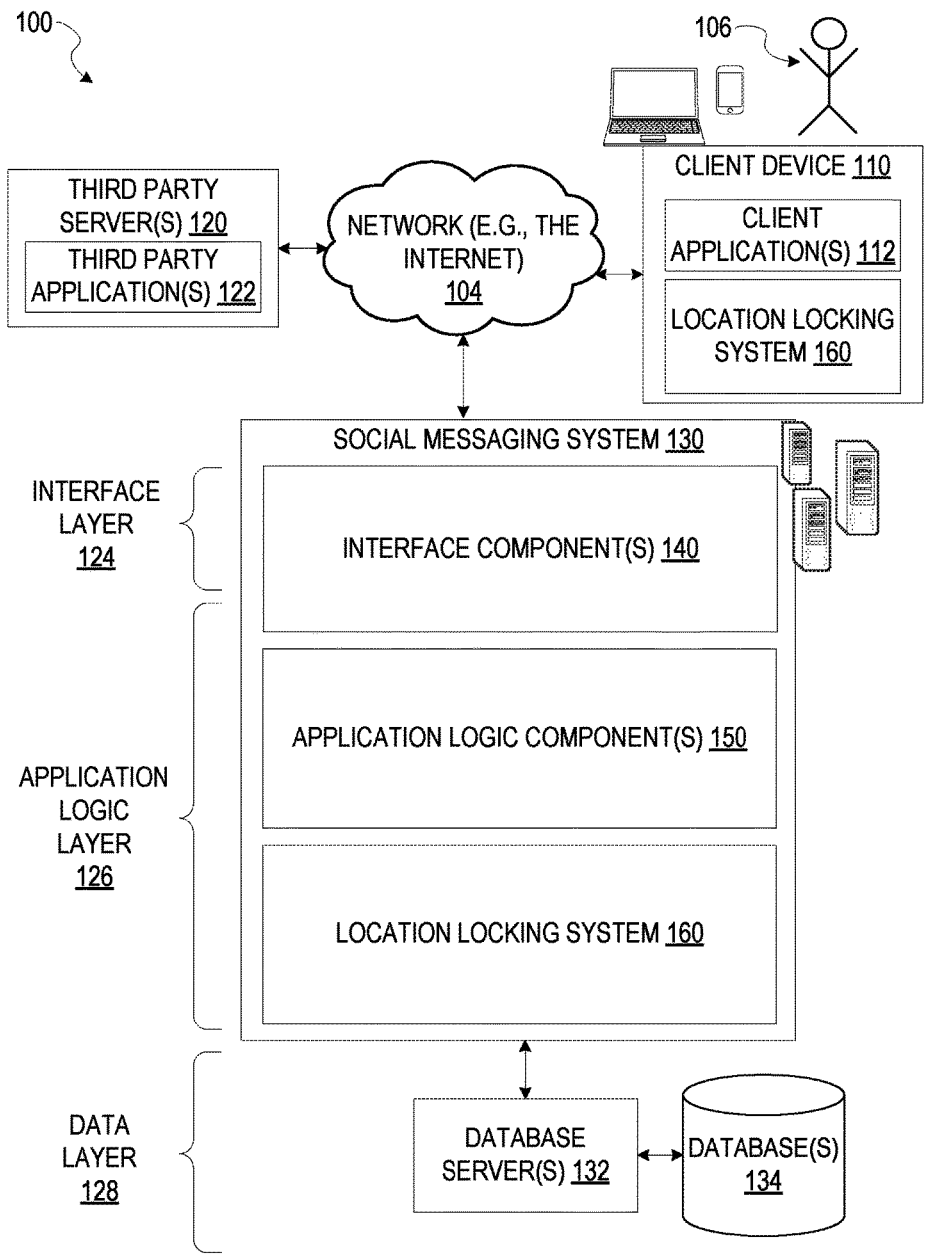
FIG. 1 is a block diagram illustrating a network system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One aspect of the present disclosure describes a system for selectively blocking location identification of a mobile computing device. In some embodiments, an application implementing a portion of the systems and methods described herein is presented to a user of a mobile computing device. The application presents an interstitial interface screen. The user may interact with the interstitial interface screen to turn on a blocking mode which selectively blocks transmission or display of location information for a period of time. For example, a user may select a three hour or twenty-four hour window, during which location information for the mobile computing device is not transmitted or displayed to a set of users or a set of mobile computing devices for users known to the user selecting the blocking window. The period of time may enable the user to initiate a location-blocking service and automatically terminate the location-blocking service.

In some embodiments, a user interacts with a graphical user interface displayed on their mobile computing device to enable a blocking mode. The user interface displays an interstitial screen presenting a set of options for the blocking mode. For example, the interstitial screen may provide options for enabling the blocking mode based on a time (e.g., three hours, twenty-four hours, or forever), a location or proximity to a location, a time of day, a time of month or year, interaction with a designated application (e.g., a text messaging application, an active telephone call, a video call, or a video game application), or any other suitable selection metric, characteristic, or aspect. In some embodiments, options for enabling the blocking mode may include a toggle for automatically enabling the blocking mode (e.g., ghost mode). The automatic toggling may be time based, location based, proximity based (e.g., based on a proximity to a specified location), combinations thereof, or based on other suitable attributes. For example, the blocking mode may automatically be toggled when a user returns home or is within a specified proximity of their home or a specified location. The systems and methods described herein may detect a home location by analyzing a location history over time, provided based on user permission or selection of location services. For example, the systems may determine a frequent charging location for a device, or a location associated with one or more specified time periods (e.g., overnight). Proximity to the automatically detected home location may automatically engage the blocking mode, and the blocking mode may be disengaged once the mobile computing device moves a predetermined distance from the home location. In instances where automated toggling of the blocking mode is time based, the systems and methods described herein may automatically block location sharing based on a time of day (e.g., a current time being past a specified hour of the day or night).

In embodiments where the blocking mode is time based, the blocking mode may automatically end or be disabled after a termination of the selected time period. Prior to termination, the blocking mode may cause presentation of a timer subtext indicating an amount of time remaining within the time period for the blocking mode. Where the blocking mode is based on a location or proximity to a location, the blocking mode may cause presentation of a proximity subtext indicating initiation of the blocking mode or termination of the blocking mode, or the mobile computing device approaching a boundary which would initiate or terminate the blocking mode.

The above is one specific example. The various embodiments of the present disclosure relate to devices and instructions that cause one or more processors of a device to selectively present or block transmission, sharing, display, or other presentation of location information or identification. A location locking system is described that enables selectively blocking location identification of a mobile computing device, such that a user may select a user interface element to share location information with friends, preclude certain friends from receiving location information, or generally prohibit others from viewing the user's location.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of the instructions, as a special-purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as having a three-tiered architecture, the inventive subject matter is by no means limited to such an architecture.

As shown in FIG. 1, the interface layer 124 consists of interface component(s) (e.g., a web server) 140, which receive requests from various client-computing devices and servers, such as a client device 110 executing client application(s) 112, and third-party server(s) 120 executing third-party application(s) 122. In response to received requests, the interface component(s) 140 communicate appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a location locking system 160 such that components of the location locking system 160 configure the client device 110 to perform a specific set of functions with respect to operations of the location locking system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the location locking system 160 to enable selective blocking of location identification of a mobile computing device (e.g., client device 110).

A client device 110, or each client device 110 interacting with the network system 100, can comprise a computing device that includes at least a display and communication capabilities with the network 104 to access the social messaging system 130, other client devices, and third-party server(s) 120. Client devices 110 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client device 110. In some embodiments, the user 106 interacts with the social messaging system 130 via the client device 110. The user 106 may not be part of the network system 100, but may be associated with the client device 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the location locking system 160 capable of selectively blocking location identification of a mobile computing device. Similarly, the client device 110 includes at least a portion of the location locking system 160, as described above. In other examples, the client device 110 may include the entirety of the location locking system 160. In instances where the client device 110 includes a portion of (or all of) the location locking system 160, the client device 110 can work alone or in cooperation with the social messaging system 130 to provide the functionality of the location locking system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the location locking system 160 may selectively block location identification of a mobile computing device in response to a time-based selection by a user. The device may selectively block broadcast or transmission of location information as a part of interacting with the social messaging system 130. In some embodiments, the selective location blocking may be performed during generation and transmission of content for an ephemeral message.

Figure 2:
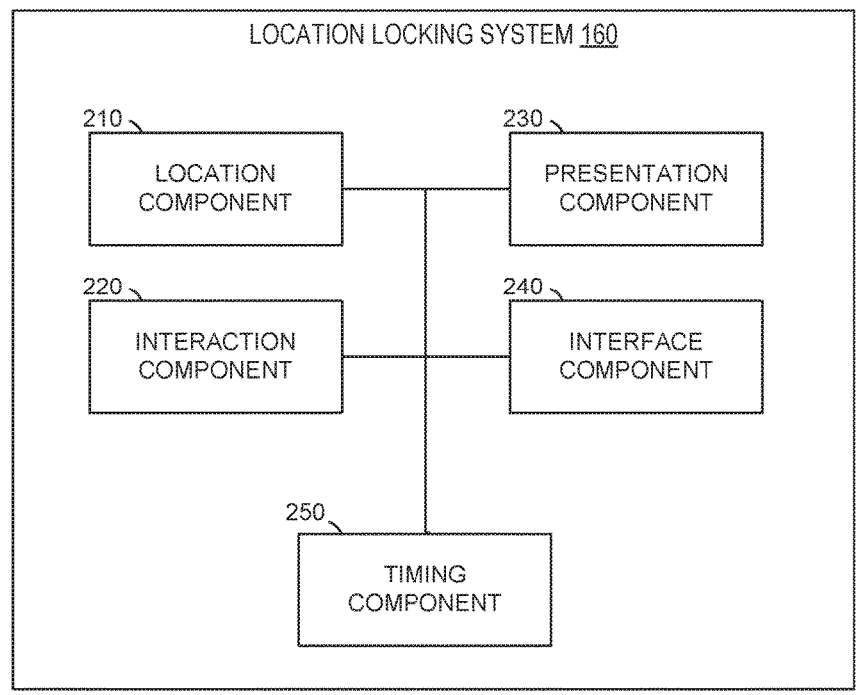
FIG. 2 is a diagram illustrating a location locking system, according to some example embodiments.

In FIG. 2, in various embodiments, the location locking system 160 can be implemented as a standalone system or implemented in conjunction with the client device 110, and is not necessarily included in the social messaging system 130. The location locking system 160 is shown to include a location component 210, an interaction component 220, a presentation component 230, an interface component 240, and a timing component 250. All, or some, of the components 210-250 communicate with each other, for example, via a network coupling, shared memory, and the like. Each component of the components 210-250 can be implemented as a single component, combined with other components, or further subdivided into multiple components. Other components not pertinent to example embodiments can also be included, but are not shown.

Figure 3:
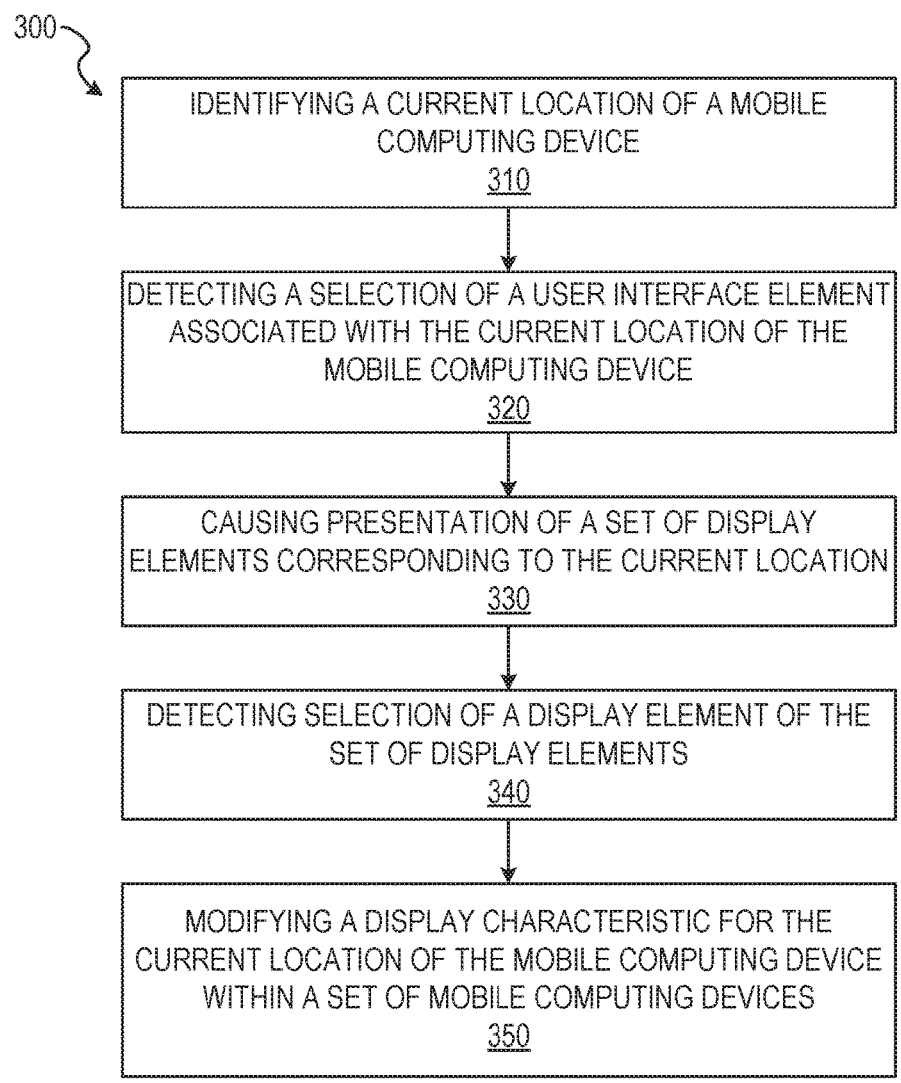
FIG. 3 is a flow diagram illustrating an example method for selectively blocking location identification of a mobile computing device, according to some example embodiments.

FIG. 3 depicts a flow diagram illustrating an example method 300 for selectively blocking location identification of a mobile computing device. The operations of the method 300 may be performed by components of the location locking system 160, and are so described below for purposes of illustration.

In operation 310, the location component 210 identifies a current location of a mobile computing device (e.g., the client device 110). The location component 210 may identify the current location of the mobile computing device via triangulation of one or more signals of the mobile computing device interacting with one or more transmission towers, via Global Positioning System signals, via movement information generated by one or more sensors of the mobile computing device, via entry of location information by a user, via one or more location services enabled for an application operating on the mobile computing device, combinations thereof, or by any other suitable means. In some instances, the location component 210 identifies the current location of the mobile computing device upon initiation or opening of an application on the mobile computing device. The application may be associated with the location locking system 160, such as an application of the social messaging system 130.

Figure 4:
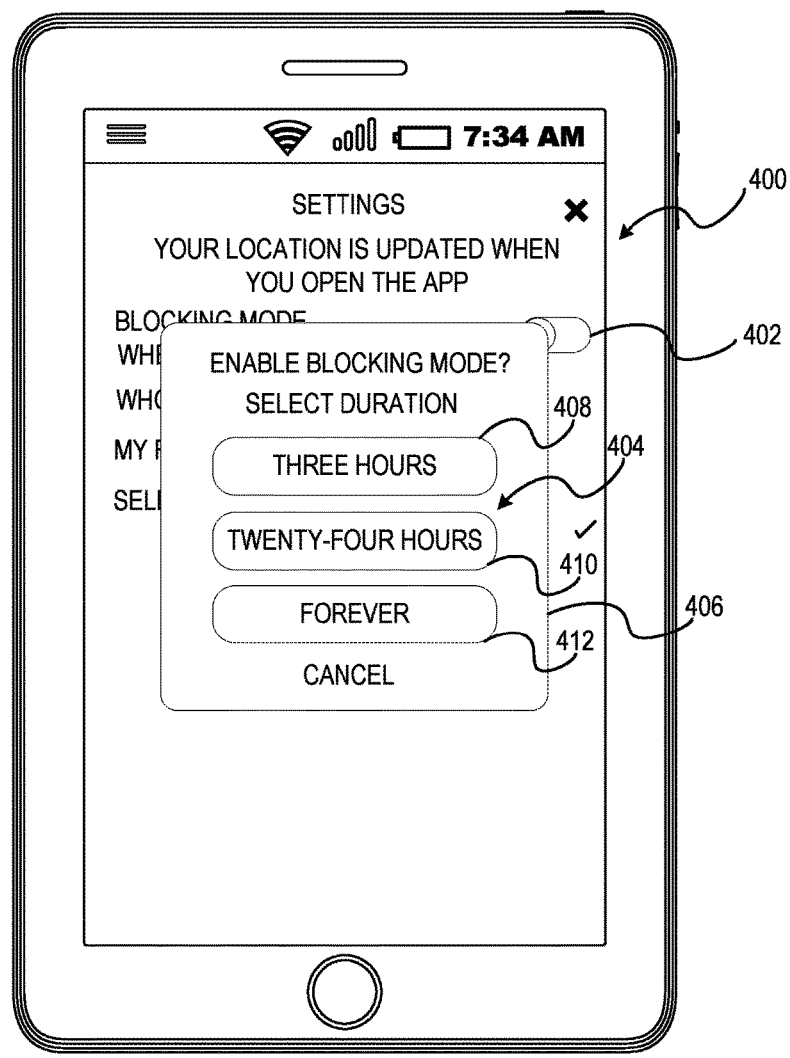
FIG. 4 is a user interface diagram depicting graphical user interface elements for selectively blocking location information, according to some example embodiments.
Figure 5:
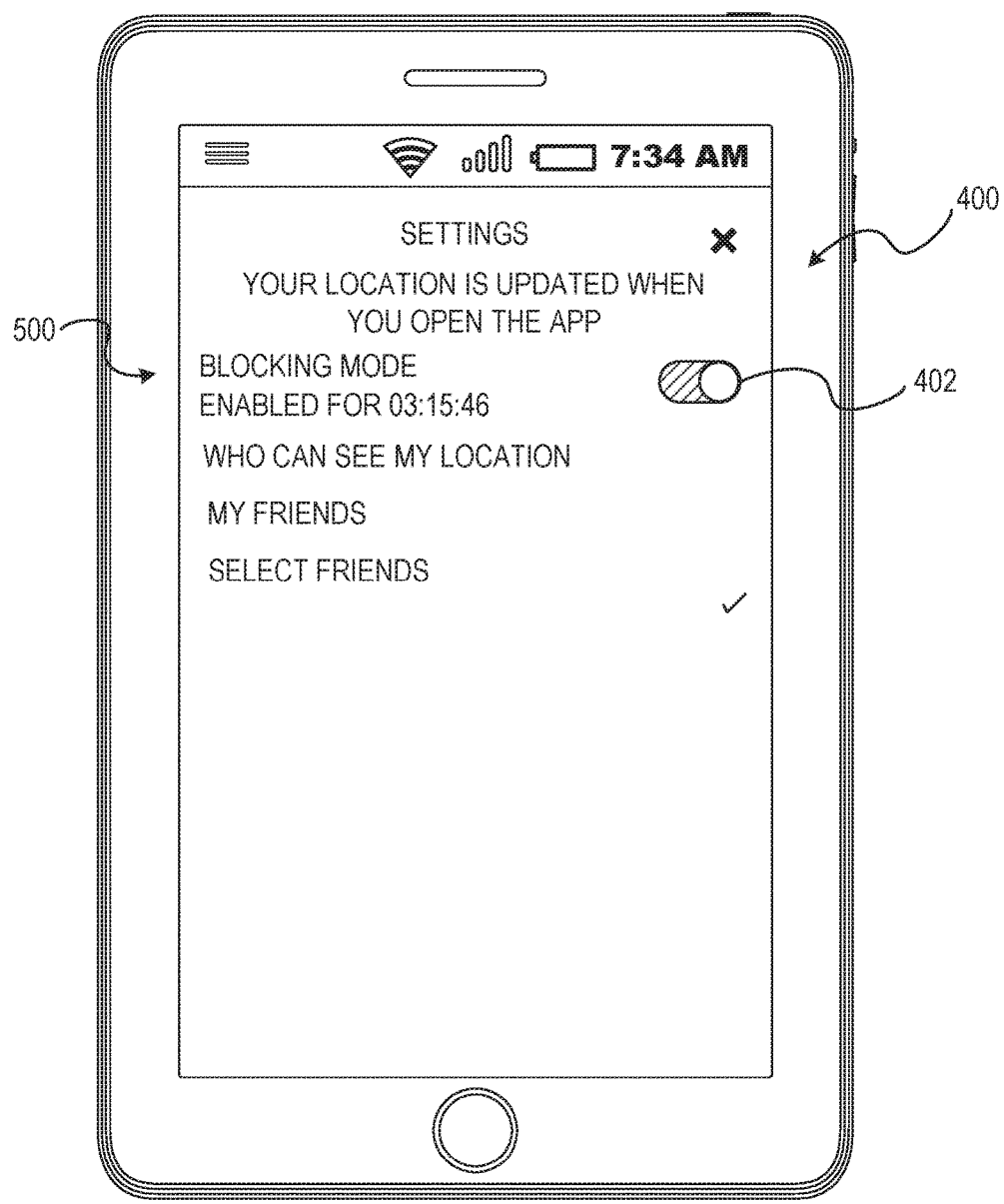
FIG. 5 is a user interface diagram depicting graphical user interface elements for selectively blocking location information, according to some example embodiments.

In operation 320, the interaction component 220 detects a selection of a user interface element associated with the current location of the mobile computing device. In some embodiments, the user interface element is presented in a graphical user interface depicted on a display component of the mobile computing device during operation of the application. As shown in FIGS. 4-5, a blocking element 402 may be presented within a graphical user interface 400 for the application. The blocking element 402 may correspond to a blocking mode of the location locking system 160. The blocking mode may prevent the mobile computing device or a server associated with the location locking system 160 from identifying, transmitting, or otherwise sharing location information (e.g., the current location) of the mobile computing device with one or more other mobile computing devices associated with one or more of the user of the mobile computing device, users within a social network of the user of the mobile computing device, the social messaging system 130, the location locking system 160, or combinations thereof.

In some embodiments, the blocking mode may be referenced or further referred to herein as a "ghost mode." In the ghost mode, location sharing is toggled to an off position and the user is no longer displayed on graphical user interfaces on others' devices. Note that the ghost mode functionality described herein is to be distinguished from turning off location services on a mobile user device. Thus, when ghost mode is turned on, the device location services are still functioning, so that the user location can still be determined and displayed on a map graphical user interface, with social media content captured in ghost mode still being geotagged. When the user turns on ghost mode after previously being present on the map, the user's bitmoji may disappear within seconds from other people's maps. When in ghost mode, the user can still see anyone on the map who has chosen to share their location with the user. In this example embodiment, each user is represented by a bitmoji. If the friend does not have a bitmoji, a profile picture within a user interface element (e.g., a ghost icon) is shown. If no profile picture is available for a particular friend, a default icon (e.g., a blank ghost) is displayed at the corresponding location.

In operation 330, the presentation component 230 causes presentation of a set of display elements. In some embodiments, the set of display elements corresponds to the current location identified in operation 310. The set of display elements may represent one or more display characteristics for the current location of the mobile computing device. Display characteristics may include colors, shapes, ideograms, characters, digital representations of users, locations on a map, combinations thereof, and any other suitable representation or set of representations.

As shown in FIG. 4, a set of display elements 404 may be presented within an interstitial display element 406. The interstitial display element 406 may be presented as an overlay on or otherwise obfuscating at least a portion of the graphical user interface 400. In some embodiments, once the blocking element 402 is selected, the graphical user interface 400 may be locked until the mobile computing device or the location locking system 160 detects selection of at least one of the set of display elements 404. In some instances, as shown in FIG. 4, the set of display elements 404 represents selections indicating limitations to be placed on sharing or otherwise transmitting the current location of the mobile computing device. In FIG. 4, the set of display elements includes three time periods: a first element 408 for a three hour time period, a second element 410 for a twenty-four hour period, and a third element 412 for an indeterminate period (e.g., forever).

In operation 340, the interaction component 220 detects selection of a display element of the set of display elements. In some embodiments, the interaction component 220 detects user interaction with an input device representing selection of the display element. For example, the interaction component 220 may include or cooperate with a user interface component, such as a touch screen, to detect a user interaction with the mobile computing device and identify a user interface element with which the user intends to interact. For example, the user may tap or touch a touch screen at a position proximate to or covering the first element 408.

Figure 8:
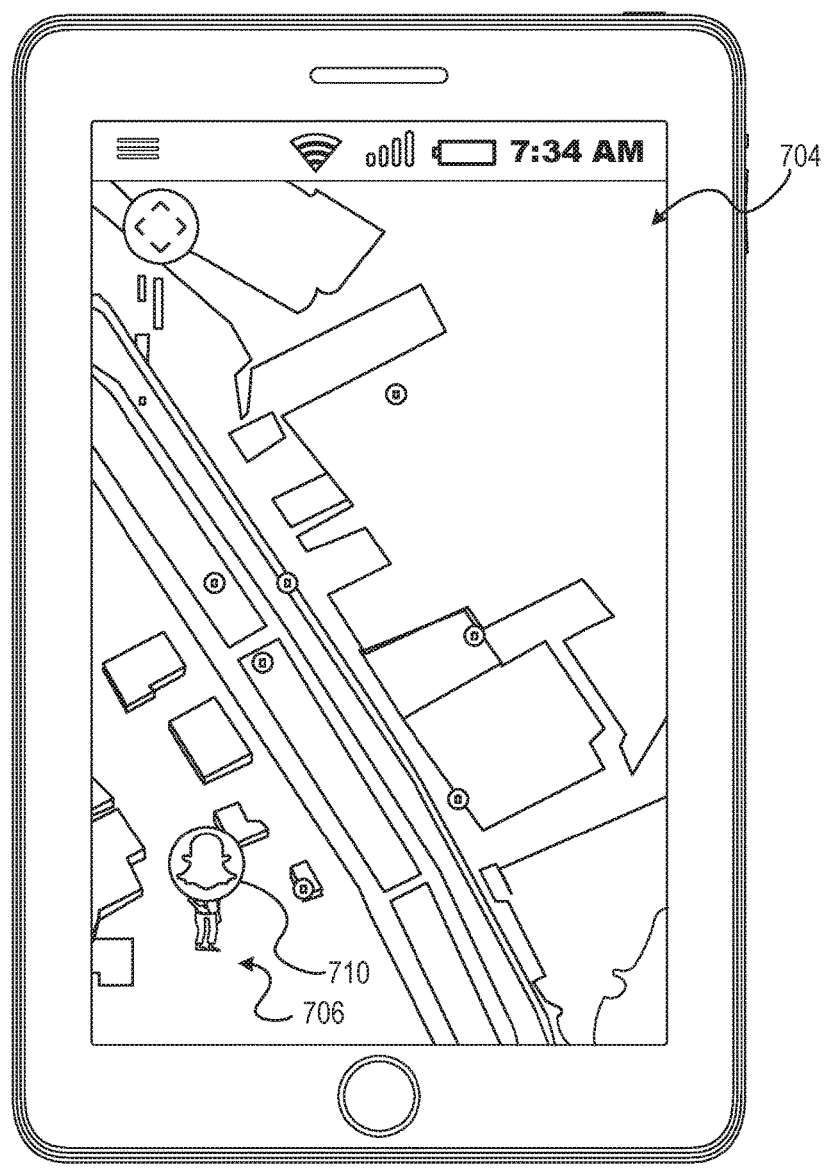
FIG. 8 is a user interface diagram depicting graphical user interface elements for blocking location information, according to some example embodiments.

In operation 350, the interface component 240 modifies a display characteristic for the current location of the mobile computing device within a set of mobile computing devices. For example, as shown in FIG. 8, the interface component 240 may obfuscate a portion of an avatar representing the current location of the mobile computing device. In some embodiments, the set of mobile computing devices are distinct from the mobile computing device associated with the current location identified in operation 310. In some instances, the mobile computing device is associated with a first user and the set of mobile computing devices are associated with a set of second users. The set of second users may be linked or otherwise associated with the first user, such as by connections within a social network defined within the social messaging system 130.

The interface component 240 may modify the display characteristic for the current location of the mobile computing device by removing an icon, representative of the mobile computing device, from a display presented at one or more of the mobile computing devices of the set of mobile computing devices. For example, the current location of the user and the mobile computing device may be presented or represented, on mobile computing devices of friends, family, and members of the user's social network, as an icon. The icon may be a picture of the user, an ideograph (e.g., an emoji, an ideogram, or a digital sticker), an avatar, an image selected by the user, a logo, or any other suitable graphical representation of the user. The icon may be presented within graphical user interfaces displayed on the set of mobile computing devices while the mobile computing device of the user is in a location-sharing mode. A position of the icon within a map, depicted on a screen of the client device 110 within a user interface, may be updated periodically (e.g., upon the user logging into an application associated with the location locking system 160 or the social messaging system 130), in real time (e.g., by continually updating or monitoring the position of the user while the user is interacting with the application), in near-real time (e.g., by position polling or periodically updating at a specified time interval), or according to any other suitable position-updating scheme.

Upon detecting selection of a display element of the set of display elements indicating a location locking interaction, the interface component 240 may modify one or more aspects of the graphical user interface at the mobile computing device of the user and at the set of mobile computing devices of users associated with a social network of the user, or otherwise suitably connected to the user. As described above, where the current location of the mobile computing device is presented as an icon on a map, the interface component 240 may modify the display characteristic by removing the icon on the map depicted on the set of mobile computing devices.

In some embodiments, the interface component 240 modifies the display characteristic by locking the current position of the icon on the map. While the user and the mobile computing device may change position, the icon remains locked in the last location identified prior to receiving the location locking interaction. In addition to locking the position of the icon, the interface component 240 may also generate a representation of the location locking interaction. For example, the interface component 240 may change a color of the icon, place a strike or "X" over the icon, or otherwise indicate that the location is locked or otherwise precluded from updating or sharing.

Figure 6:
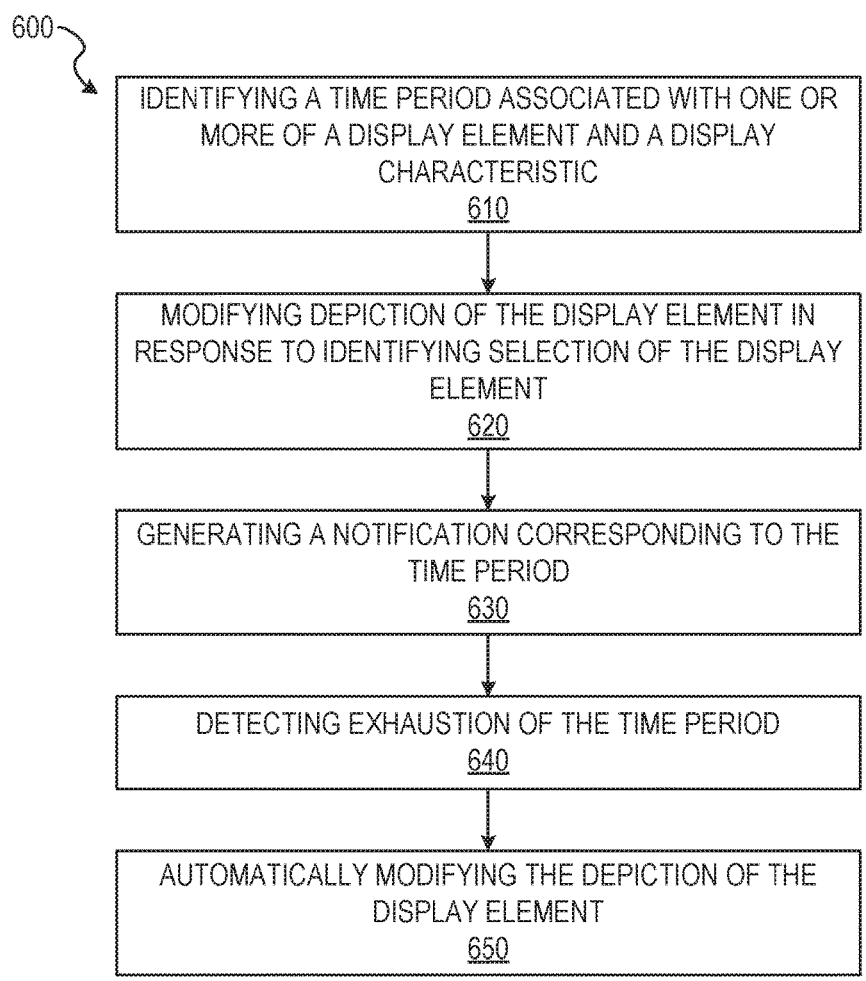
FIG. 6 is a flow diagram illustrating an example method for selectively blocking location identification of a mobile computing device, according to some example embodiments.

FIG. 6 depicts a flow diagram illustrating an example method 600 for selectively blocking location identification of a mobile computing device. The operations of the method 600 may be performed by components of the location locking system 160. In some instances, certain operations of the method 600 may be performed using one or more operations of the method 300 or as sub-operations of one or more operations of the method 300, as will be explained in more detail below.

In operation 610, the timing component 250 identifies a time period. In some embodiments, the time period is associated with one or more of the display element, the display characteristic, or combinations thereof. Upon identifying the time period, the timing component 250 may initiate the time period. The time period may be initiated in association with the display element, and at a first time. In some instances, the first time corresponds to selection of the display element.

In operation 620, the interface component 240 modifies a depiction of the display element. In some embodiments, the interface component 240 modifies the depiction of the display element in response to detecting selection of the display element. For example, as shown in FIG. 5, a display element 500 may be depicted within the graphical user interface 400, proximate to the blocking element 402, and represent information related to the blocking element 402. Once the blocking element 402 is selected and a display element of the set of display elements 404 is selected, the interface component 240 may modify presentation of the display element to include at least a portion of the time period.

Figure 7:
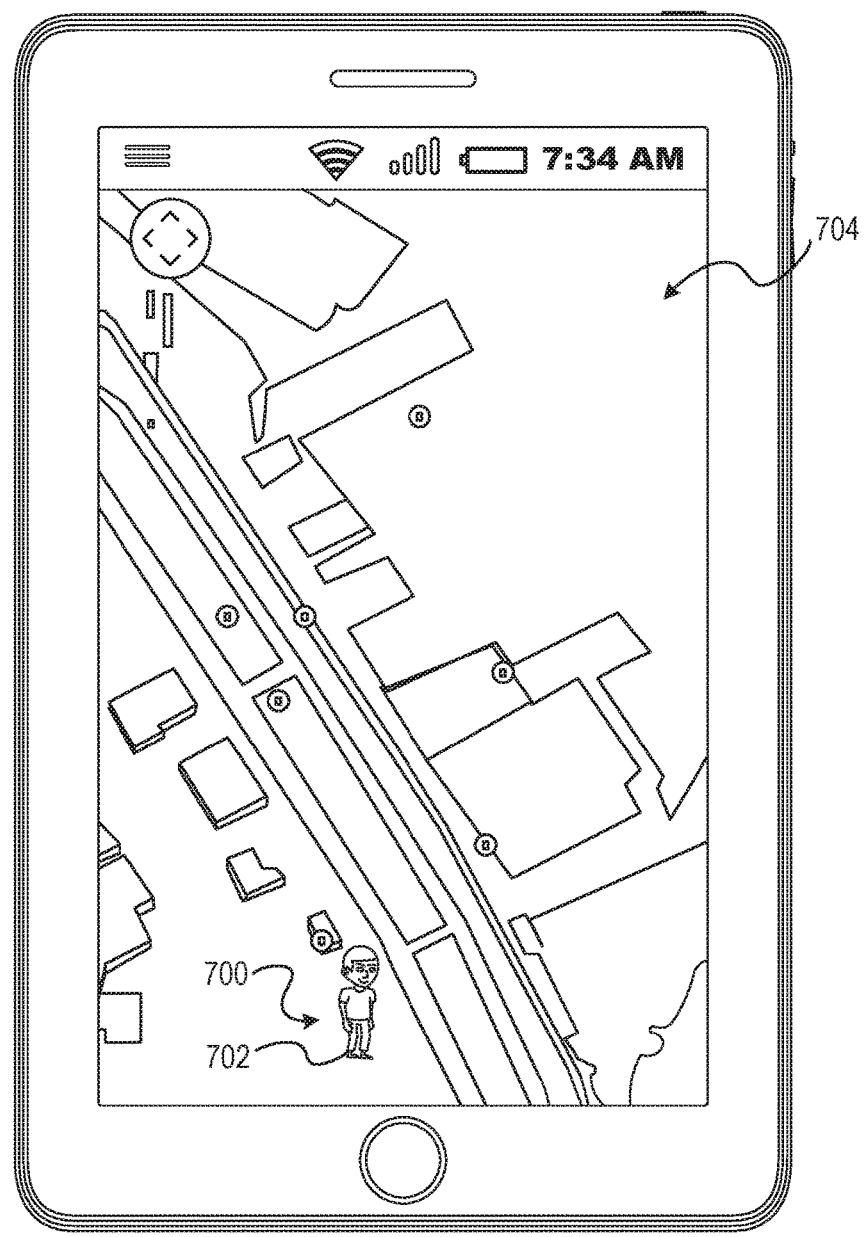
FIG. 7 is a user interface diagram depicting graphical user interface elements presenting location information, according to some example embodiments.

In some embodiments, along with modifying the depiction of the display element, the interface component 240 modifies a display characteristic for the current location of the mobile computing device within a set of mobile computing devices. The display characteristic may be modified for the current location of the mobile computing device by changing the current location from a first display characteristic to a second display characteristic. For example, as shown in FIG. 7, a first display characteristic 700 may comprise an avatar 702 associated with a user of the mobile computing device. The first display characteristic 700 may also include a position or location on a map 704. The avatar 702 may be depicted as positioned on the map 704 within the set of mobile computing devices (e.g., mobile computing devices of friends of the user). Modification of the first display characteristic 700 to the second display characteristic 706, shown in FIG. 8, may comprise presenting the avatar 702 with an obfuscating element 710 positioned over the avatar 702. For example, where the avatar 702 is a representation of the user of the mobile computing device (e.g., an animated person or character), the second display characteristic 706 may be generated by placing a mask, a sign, or another obfuscating element 710 in front of a face of the animated character or animating the character to place the mask, sign, or obfuscating element on the face of the character. In some instances, the second display characteristic 706 includes a location on the map 704, such as a subsequent location at which the animated character is positioned at a time subsequent to the position of the animated character at a location associated with the first display characteristic 700.

In operation 630, the interface component 240 generates a notification corresponding to the time period. In some embodiments, the notification is presented within a graphical user interface proximate to the modified depiction of the display element. As shown in FIG. 5, the notification may be included in the display element 500 as a countdown or timer corresponding to the time period.

In operation 640, the timing component 250 detects exhaustion of the time period. The exhaustion of the time period may be detected at a time (e.g., a second time) subsequent to a time (e.g., a first time) at which the time period is initiated, as in operation 610. The timing component 250 may detect exhaustion of the time period by determining that a timer presented with the display element 500 has reached zero.

In some embodiments, as described above with respect to operation 620, where the interface component 240 modifies the display element and the display characteristic, for the current location, from the first display characteristic to the second display characteristic, the interface component 240 may automatically modify the display characteristic of the current location from the second display characteristic to a third display characteristic. In some instances, modification of the current location from the second display characteristic to the third display characteristic is performed automatically, in response to detecting the exhaustion of the time period by the timing component 250. In some instances, the third display characteristic is identical to the first display characteristic. In such instances, the interface component 240 may modify the current location from the second display characteristic to the third display characteristic by reverting display characteristics of the current location back to the first display characteristic.

In some instances, the interface component 240 modifies the second display characteristic to the third display characteristic by changing the second display characteristic to an intermediate characteristic. In such instances, the interaction component 220 detects an interaction at the mobile computing device. In response to the interaction component 220 detecting the interaction, the interface component 240 modifies the intermediate characteristic of the current location to the first display characteristic.

In operation 650, the interface component 240 automatically modifies the depiction of the display element. In some embodiments, the interface component 240 reverts the depiction in response to detecting exhaustion of the time period. In some embodiments, as shown in FIGS. 7-8, the interface component 240 may revert the depiction by removing the obfuscating element from in front of the avatar, determining a current location of the mobile computing device, and placing the avatar at a position on the map corresponding to the new current location.

As shown in FIGS. 7-8, toggling a blocking mode "on" may transition display of the user's location in others' graphical user interfaces from a representation in FIG. 7 to the representation in FIG. 8. Where the blocking mode is toggled "off," the display in the others' graphical user interfaces may transition from the representation in FIG. 8 to the representation in FIG. 7.

In some embodiments, in addition to user locations on a map, a carousel may be presented at each user's mobile computing device. The carousel may include icons and locations for each user sharing a current location with the viewing user. In some instances, each friend is represented by a respective rectangular friend panel or card at the bottom of the screen. Swiping left or right on the friend panel brings into view the next or previous friend panel as the case may be. In some embodiments, swiping to a particular friend automatically centers the map view on the icon of that friend. Note that all of the user's friends sharing location should be visible in the carousel, not just those in the current viewport. Friends are in this embodiment ordered in the carousel by update recency.

In embodiments where users sharing current locations are presented in or represented within the carousel, toggling the ghost mode or blocking mode into an "on" position, precluding sharing of location information, the user may remain within the carousel. Though the user or a representation thereof remains in the carousel, location information may be removed from an access control list and the carousel. Users within the list or carousel may remain the same, while their location information is removed from a data structure or database populating the carousel or the access control list, preventing tracking of the user or viewing the current location of the user.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform one or more operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an application programming interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 9:
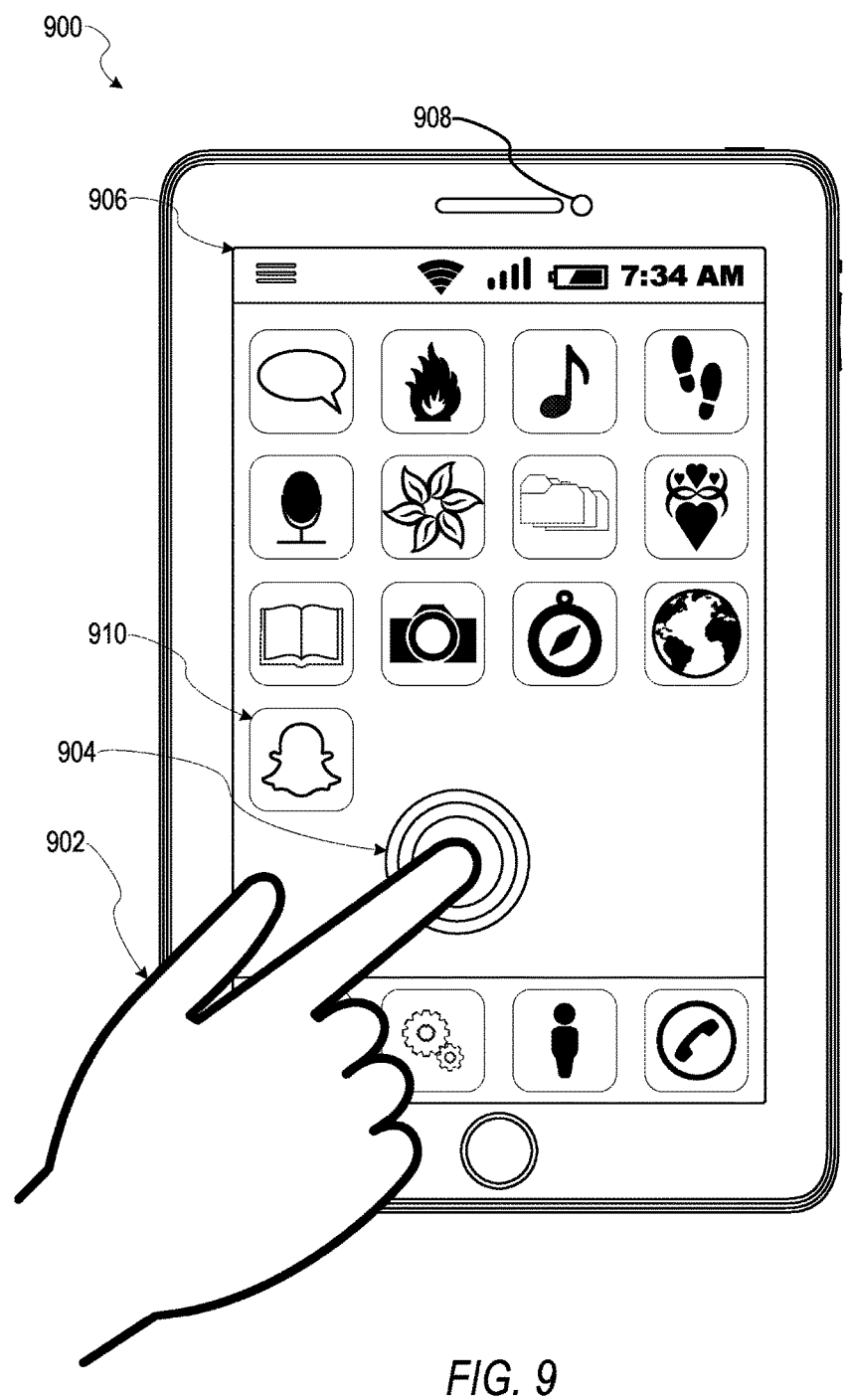
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the location locking system 160 or a selectable user interface element to initiate capture of a video stream or succession of images and pass the video stream or succession of images to the location locking system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 that, consistent with some embodiments, allows users to exchange ephemeral messages that include media content. In this example, the social messaging app 910 can incorporate aspects of embodiments described herein. For example, in some embodiments the social messaging app 910 includes an ephemeral gallery of media created by users of the social messaging app 910. These galleries may consist of videos or pictures posted by a user and made viewable by contacts (e.g., "friends") of the user. Alternatively, public galleries may be created by administrators of the social messaging app 910 consisting of media from any users of the application (and accessible by all users). In yet another embodiment, the social messaging app 910 may include a "magazine" feature which consists of articles and other content generated by publishers on the social messaging app 910's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the location locking system 160 may selectively block location information within a user interface configured to receive the ephemeral message, and transmit the ephemeral message to another device using the ephemeral message system, without presenting the location information of the user or the mobile computing device transmitting or generating the ephemeral message.

Software Architecture

Figure 10:
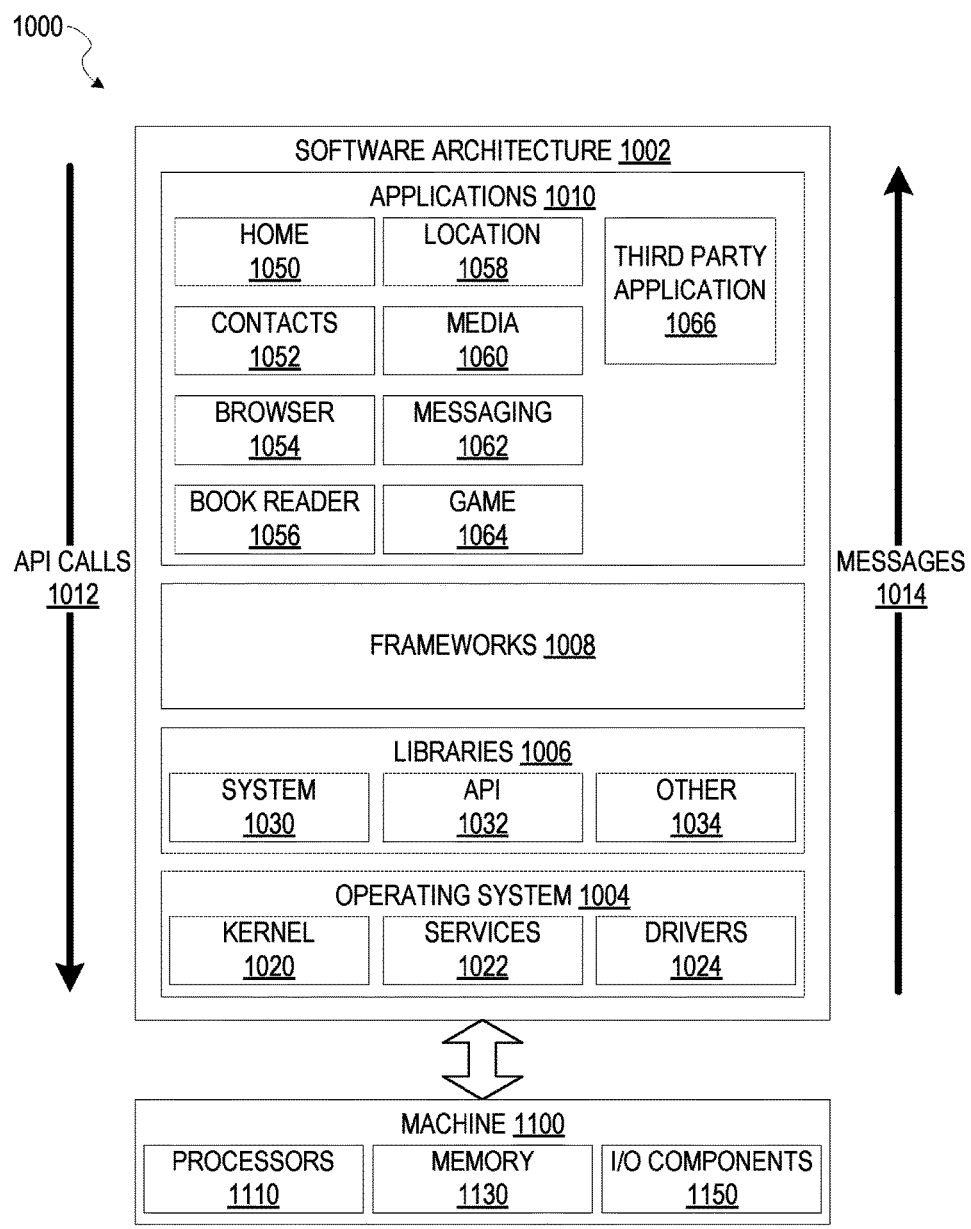
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™. WINDOWS® PHONE, or another mobile operating system. In this example, the third-party application 1066 can invoke the API calls 1012 provided by the operating system 1004 to facilitate functionality described herein.

Example Machine Architecture and Machine-Readable Medium

Figure 11:
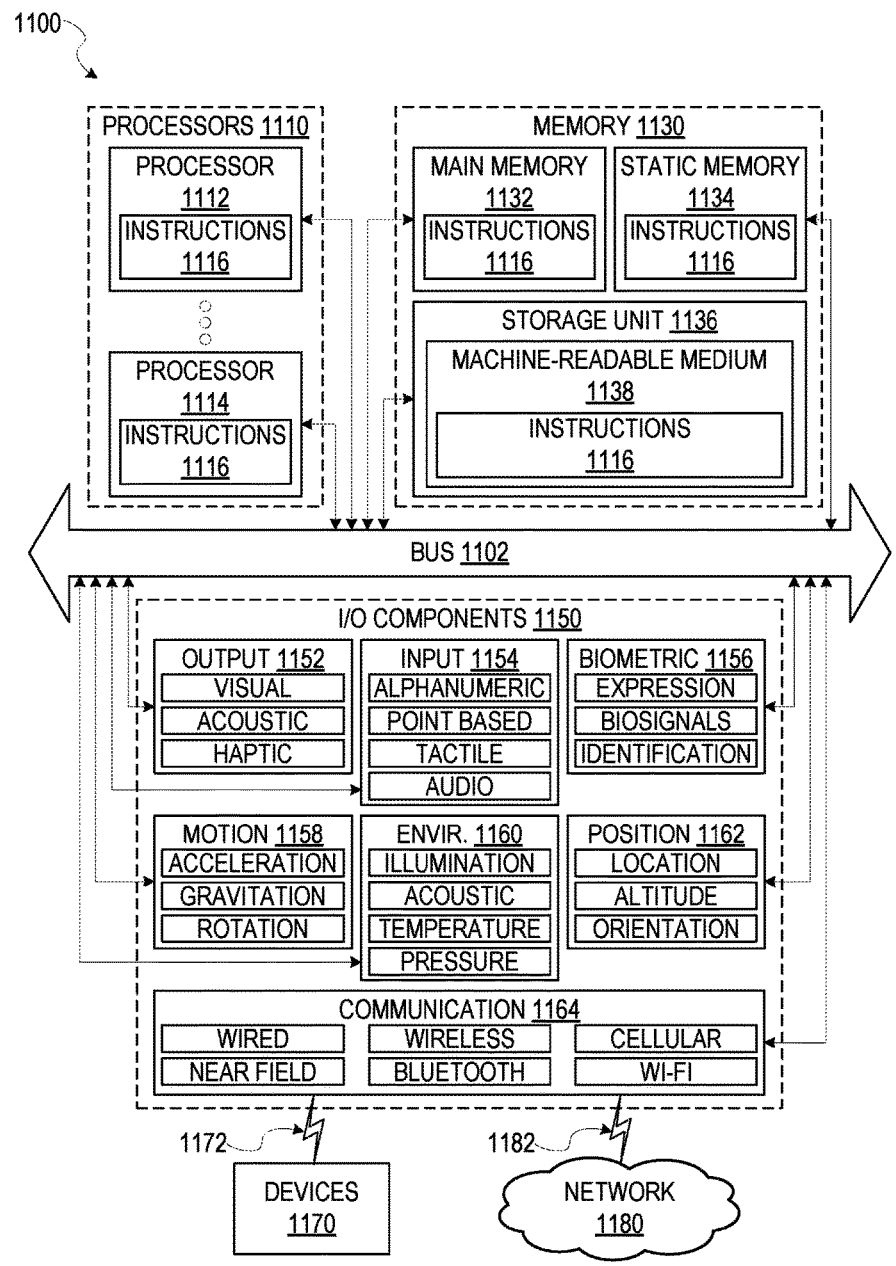
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor-executable instructions) from a machine-readable medium (e.g., a non-transitory machine-readable storage medium) and perform any of the methodologies discussed herein. Specifically. FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by processors of the machine (e.g., the processors 1110), cause the machine to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components. Near Field Communication (NFC) components. BLUETOOTH® components (e.g., BLUETOOTH® Low Energy). WI-FI@ components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code. Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another.

Additionally, since the machine-readable medium 1138 is tangible, the medium may be considered to be a machine-readable device.

Language

Throughout this specification, plural instances may implement components, operations, or structures described as a single instance. Although individual operations of one or more methods are illustrated and described as separate operations, one or more individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying, by one or more processors, a current location of a mobile computing device;
   detecting, by the one or more processors, a selection of a user interface element associated with the current location of the mobile computing device;
   causing, by the one or more processors, presentation of a set of display elements corresponding to the current location, the set of display elements representing one or more display characteristics for the current location of the mobile computing device;
   detecting, by the one or more processors, selection of a display element of the set of display elements;
   in response to detecting the selection of the display element:
      modifying, by the one or more processors, a display characteristic for the current location of the mobile computing device within a set of mobile computing devices, the modifying of the display characteristic for the current location of the mobile computing device changing the current location from a first display characteristic to a second display characteristic;
      modifying, by the one or more processors, a depiction of the display element;
      identifying, by the one or more processors, a time period associated with one or more of the display element and the display characteristic;
      generating, by the one or more processors, a notification corresponding to the time period, the notification presented within a graphical user interface proximate to the modified depiction of the display element;
      initiating, by the one or more processors, the time period associated with the display element, the time period initiated at a first time;
   detecting, by the one or more processors, exhaustion of the time period at a second time subsequent to the first time; and
   in response to detecting the exhaustion of the time period:
      automatically reverting the depiction of the display element, and
      automatically modifying the display characteristic for the current location of the mobile computing device from the second display characteristic to a third display characteristic.

2. The method of claim 1, wherein modifying the second display characteristic to the third display characteristic comprises reverting the second display characteristic to the first display characteristic.

3. The method of claim 1, wherein modifying the second display characteristic to the third display characteristic comprises changing the second display characteristic to an intermediate characteristic, and the method further comprising:
   detecting an interaction at the mobile computing device; and
   in response to detecting the interaction, modifying the intermediate characteristic for the current location to the first display characteristic.

4. The method of claim 1, wherein the first display characteristic is a first location on a map and the second display characteristic is a subsequent location on the map.

5. A system comprising:
   one or more processors; and
   a non-transitory processor-readable storage medium storing processor-executable instructions that, when executed by the one or more processors, cause the one or more processors to perform operations comprising:
   identifying, by the one or more processors, a current location of a mobile computing device;

detecting, by the one or more processors, a selection of a user interface element associated with the current location of the mobile computing device;

causing, by the one or more processors, presentation of a set of display elements corresponding to the current location, the set of display elements representing one or more display characteristics for the current location of the mobile computing device;

detecting, by the one or more processors, selection of a display element of the set of display elements;

in response to detecting the selection of the display element:

modifying, by the one or more processors, a display characteristic for the current location of the mobile computing device within a set of mobile computing devices, the modifying of the display characteristic for the current location of the mobile computing device changing the current location from a first display characteristic to a second display characteristic;

modifying, by the one or more processors, a depiction of the display element;

identifying, by the one or more processors, a time period associated with one or more of the display element and the display characteristic;

generating, by the one or more processors, a notification corresponding to the time period, the notification presented within a graphical user interface proximate to the modified depiction of the display element;

initiating, by the one or more processors, the time period associated with the display element, the time period initiated at a first time;

detecting, by the one or more processors, exhaustion of the time period at a second time subsequent to the first time; and in response to detecting the exhaustion of the time period:
automatically reverting the depiction of the display element, and
automatically modifying the display characteristic for the current location of the mobile computing device from the second display characteristic to a third display characteristic.

6. The system of claim 5, wherein modifying the second display characteristic to the third display characteristic comprises changing the second display characteristic to an intermediate characteristic, and the operations further comprising:

detecting an interaction at the mobile computing device; and in response to detecting the interaction, modifying the intermediate characteristic for the current location to the first display characteristic.

7. The system of claim 5, wherein the first display characteristic is a first location on a map and the second display characteristic is a subsequent location on the map.

8. A non-transitory processor-readable storage medium storing processor-executable instructions that, when executed by a processor of a machine, cause the machine to perform operations comprising:

identifying, by one or more processors, a current location of a mobile computing device;

detecting, by the one or more processors, a selection of a user interface element associated with the current location of the mobile computing device;

causing, by the one or more processors, presentation of a set of display elements corresponding to the current location, the set of display elements representing one or more display characteristics for the current location of the mobile computing device;

detecting, by the one or more processors, selection of a display element of the set of display elements;

in response to detecting the selection of the display element:

modifying, by the one or more processors, a display characteristic for the current location of the mobile computing device within a set of mobile computing devices, the modifying of the display characteristic for the current location of the mobile computing device changing the current location from a first display characteristic to a second display characteristic;

modifying, by the one or more processors, a depiction of the display element;

identifying, by the one or more processors, a time period associated with one or more of the display element and the display characteristic;

generating, by the one or more processors, a notification corresponding to the time period, the notification presented within a graphical user interface proximate to the modified depiction of the display element;

initiating, by the one or more processors, the time period associated with the display element, the time period initiated at a first time;

detecting, by the one or more processors, exhaustion of the time period at a second time subsequent to the first time; and in response to detecting the exhaustion of the time period:
automatically reverting the depiction of the display element, and
automatically modifying the display characteristic for the current location of the mobile computing device from the second display characteristic to a third display characteristic.

9. The non-transitory processor-readable storage medium of claim 8, wherein modifying the second display characteristic to the third display characteristic comprises reverting the second display characteristic to the first display characteristic.

10. The non-transitory processor-readable storage medium of claim 8, wherein modifying the second display characteristic to the third display characteristic comprises changing the second display characteristic to an intermediate characteristic, and the operations further comprising:

detecting an interaction at the mobile computing device; and in response to detecting the interaction, modifying the intermediate characteristic for the current location to the first display characteristic.

11. The non-transitory processor-readable storage medium of claim 8, wherein the first display characteristic is a first location on a map and the second display characteristic is a subsequent location on the map.

* * * * *